(12) United States Patent
Morgan et al.

(10) Patent No.: US 6,429,258 B1
(45) Date of Patent: Aug. 6, 2002

(54) POLYMERIZATION OF FLUOROMONOMERS

(75) Inventors: Richard Alan Morgan, Vienna; Clay Woodward Jones; Theodore Arthur Treat, both of Washington, all of WV (US); Jeffrey A. Hrivnak, Glen Mills, PA (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/570,853

(22) Filed: May 12, 2000

Related U.S. Application Data

(60) Provisional application No. 60/135,074, filed on May 20, 1999.

(51) Int. Cl.[7] .................................................. C08J 2/16
(52) U.S. Cl. ....................... 524/805; 526/242; 524/545; 524/546; 524/544
(58) Field of Search .......................... 526/242; 524/545, 524/546, 544, 805

(56) References Cited

U.S. PATENT DOCUMENTS

| | | | |
|---|---|---|---|
| 2,559,752 A | 7/1951 | Berry | 260/29.6 |
| 3,271,341 A | 9/1966 | Garrison, Jr. | 260/29.6 |
| 4,789,717 A | 12/1988 | Giannetti et al. | 526/209 |
| 5,563,213 A | * 10/1996 | Mayer | 524/805 |

FOREIGN PATENT DOCUMENTS

| | | | |
|---|---|---|---|
| EP | 0 006 346 A1 | 1/1980 | C08F/14/26 |
| EP | 0 248 446 | 12/1987 | C08F/14/26 |
| EP | 0 771 823 A1 | 5/1997 | C08F/14/18 |
| WO | 96/22313 | 7/1996 | C08F/14/26 |
| WO | 96/24625 | 8/1996 | C08F/214/26 |

OTHER PUBLICATIONS

Seguchi, et al., Morphology of Polytetrafluoroethylene Prepared by Radiation–Induced Emulsion Polymerization, *J. Polym. Sci. Polymer Phys. Ed.*, 12, 2567–2576, 1974.

Kasai, Perfluoropolyethers with Acid End Groups: Amphiphilicity and Emulsification, *J. Appl. Polym. Sci.*, 57, 797–809, 1995.

* cited by examiner

*Primary Examiner*—David W. Wu
*Assistant Examiner*—William K Cheung

(57) ABSTRACT

Aqueous dispersion polymerization of fluoromonomers is improved by using a combination of fluorosurfactants, one of which is a perfluoropolyether carboxylic acid or salt.

9 Claims, No Drawings

POLYMERIZATION OF FLUOROMONOMERS

RELATED APPLICATION

This application claims the benefit of Provisional Application No. 60/135,074, filed May 20, 1999.

FIELD OF THE INVENTION

This invention is in the field of processes for polymerizing fluorinated monomers, in particular aqueous dispersion polymerization processes.

BACKGROUND OF THE INVENTION

Dispersion processes for polymerizing fluorinated monomers (fluoromonomers) in aqueous media are well known. Such processes employ a surfactant, i.e., a dispersant, to provide stability and permit the polymerization to be carried to commercially acceptable solids concentrations.

Dispersants that have been used in dispersion polymerization processes include the dispersants containing fluoroalkyl groups, such as perfluoroalkyl carboxylic acids and salts, disclosed by Berry in U.S. Pat. No. 2,559,752; the perfluoroalkyl ethane sulfonic acids and salts disclosed by Khan & Morgan in U.S. Pat. No. 4,380,618, Blaise & Grimaud in U.S. Pat. No. 4,025,709 and Baker & Zipfel in U.S. Pat. Nos. 5,688,884 and 5,789,508; the perfluoroalkoxy benzene sulfonic acids and salts disclosed by Morgan in U.S. Pat. No. 4,621,116; the partially-fluorinated carboxylic acids and salts disclosed by Feiring et al. in U.S. Pat. No. 5,763,552; and the perfluoropolyether carboxylic acids and salts disclosed by Garrison in U.S. Pat. No. 3,271,341, Giannetti & Visca in U.S. Pat. No. 4,864,006 and Abusleme & Maccone in European Patent Application Publication 0 625 526. Different dispersants are chosen for use in dispersion polymerization because of their influence on reaction rate, dispersed fluoropolymer particle size, dispersion stability, color and the like. The examples of the '341 patent reveal that the use of perfluoropolyether carboxylic acids/salt yielded polytetrafluoroethylene dispersions having particle size in the range of 152–299 nm.

Perfluoropolyethers having neutral end groups have been added to dispersion polymerizations as disclosed, for example, in the '006 patent mentioned above and by Giannetti et al. in U.S. Pat. No. 4,789,717.

Mayer in U.S. Pat. No. 5,563,213 discloses aqueous dispersions of melt-processible dipolymer of tetrafluoroethylene (TFE) and fluoroalkyl perflurovinyl ether having number-average particle size of at most 50 nm. Mayer states that the fluorinated emulsifier is advantageously added in an amount somewhat higher than customary, and the example uses an emulsifier concentration of 0.5 wt % based on the water charge. Mayer indicates that a customary amount is, for example, 0.1–0.15% based on the mass of polymerization liquor. Morgan in PCT Publication WO96/24625 discloses an aqueous process for polymerizing at least two fluoromonomers using a surfactant concentration that is at least 1.2× the critical micelle concentration for the surfactant. The disclosed process yields dispersions having small particle size. Example 1 uses a fluorosurfactant concentration of 0.4 wt % based on the water charge (a concentration greater than the critical micelle concentration) to obtain a dispersion of a copolymer of TFE and hexafluoropropylene (HFP) having average particle size of 29 nm.

The '752 Berry patent cited above also discloses the formation of elongated or ribbon shaped particles of polytetrafluoroethylene (PTFE). Example III for which substantially all of the polymer particles were elongated ribbons used a fluorosurfactant concentration of more than 2 wt % based on the water charge. Berry does not describe the molecular weight of the PTFE resins that he produced. Folda et al. in European Patent Application Publication 0 248 446 disclose a process for producing an anisotropic, liquid crystalline dispersion of TFE polymer by polymerizing in the presence of fluorosurfactant at a concentration in the range extending from the critical micelle concentration to the total solubility of the surfactant. The anisotropic dispersion of Folda et al. contains a high proportion of rod-like particles. The only molecular weight reported by Folda for his rod-shaped resin was 25,000. Seguchi, et al. (J. Polym. Sci., Polymer Phys. Ed., 12, 2567–2576 (1974)) state that higher surfactant levels in emulsion polymerization of PTFE afford rod-like particles but that molecular weight decreases. It is stated that rod-like particles are obtained when the resin molecular weight is between $10^5$ and $5.5 \cdot 10^5$ and, furthermore, that granular particles are obtained with molecular weights above $10^6$.

Improved dispersion polymerization processes are desired. Areas for improvement include increased polymerization rate, enhanced incorporation of comonomers having relatively low reactivity, reduced spherical dispersion particle size production of rod-shaped dispersion particles, and reduced coagulum formation, especially with reduced fluorosurfactant concentration.

SUMMARY OF THE INVENTION

This invention provides a process comprising polymerizing at least one fluorinated monomer in an aqueous medium containing initiator and dispersing agent to obtain an aqueous dispersion of particles of fluoropolymer, wherein said dispersing agent is a combination of at least two fluorosurfactants, at least one of said fluorosurfactants being perfluoropolyether carboxylic acid or salt thereof, and at least one of said fluorosurfactants being fluoroalkyl carboxylic or sulfonic acid or salt thereof, or fluoroalkoxy aryl sulfonic acid or salt thereof.

The invention further provides a dispersion of substantially-spherical fluoropolymer particles in an aqueous medium containing fluorosurfactant, said dispersion containing at least 20% solids by weight based on total weight of dispersion, said particles having average diameter of no more than 150 nanometer, and wherein the concentration of said fluorosurfactant is no more than 0.35% by weight based on the weight of water in said dispersion.

The invention additionally provides a dispersion of substantially rod-shaped fluoropolymer particles in an aqueous medium containing fluorosurfactant, wherein the concentration of said fluorosurfactant is no more than 0.35% by weight based on the weight of water in said dispersion.

The invention additionally provides a dispersion comprising fluoropolymer particles in an aqueous medium wherein said fluoropolymer particles have a number average molecular weight of at least about $1 \cdot 10^6$ preferably at least about $3 \cdot 10^6$, and at least about 20% of said particles have a length to diameter ratio of greater than 3.

DETAILED DESCRIPTION

It has been discovered that aqueous dispersion polymerization of fluoromonomers using a dispersing agent that is a mixture of fluorosurfactants yields improved results when one of the component surfactants present is a perfluoropolyether (PFPE) carboxylic acid or its salt ("PFPE having carboxyl ends"). Other surfactant present includes fluorosurfactants commonly used in dispersion polymerization, such as fluoroalkyl carboxylic or sulfonic acid or salt thereof. Improvements include enhanced comonomer incorporation into copolymers, increased polymerization rate, production of rod-shaped particles, and/or reduced dispersion particle size. Surprisingly, the PFPE acid/salt can be a minor part of total fluorosurfactant to achieve such effects, and total fluorosurfactant concentration can be low.

The aqueous dispersion polymerization process of the present invention is conventional except for the use of PFPE carboxylic acid or salt thereof as a component of the dispersing agent for the polymerization of fluorinated monomer. Organic liquid such as 1,1,2-trichloro-1,2,2-trifluoroethane can be present in the aqueous medium, but solvent-free aqueous dispersion polymerization is preferred. The initiator is water-soluble, and will generally be used in the amount of 2–500 ppm based on the weight of water present. Examples of such initiators include ammonium persulfate, potassium persulfate, potassium permanganate/oxalic acid, and disuccinic acid peroxide. The polymerization can be carried out by charging the polymerization reactor with water, surfactant, monomer, and optionally chain transfer agent, agitating the contents of the reactor, and heating the reactor to the desired polymerization temperature, e. g., 25°–110° C., and then adding initiator at the desired rate to start and continue the polymerization. Additional monomer can be added to the reactor to replenish monomer that is consumed. Additional surfactant can also be added to the reactor during the polymerization.

There are several alternatives for regulating the rate of polymerization, and these are applicable for the process of this invention. After initiator injection and reaction kickoff, additional monomer is usually added to maintain the chosen pressure. The monomer may be added at a constant rate, with agitator speed changed as necessary to increase or decrease polymerization rate and thus to maintain constant total pressure. Alternatively, the total pressure and the agitator speed may both be held constant, with monomer added as necessary to maintain the constant pressure. A third alternative is to carry out the polymerization in stages with variable agitator speed, but with steadily increasing monomer feed rates. Another alternative is to hold agitator speed constant and vary the pressure by controlling monomer feed rate to maintain desired reaction rate. One skilled in the art will recognize that other control schemes can be used.

The fluorosurfactant mixture employed in the dispersion polymerization process of the present invention includes fluorosurfactant that contains fluoroalkyl and at most one ether oxygen, and thus is not polyether. If ether oxygen is present, one of the oxygen-carbon bonds preferably links the ether oxygen to a segment of the molecule containing no fluorine. Such surfactants include those commonly used in dispersion polymerization of fluoromonomers. Examples of such surfactants include fluoroalkyl, preferably perfluoroalkyl, carboxylic acids and salts thereof having 6–20 carbon atoms, preferably 6–12 carbon atoms, such as ammonium perfluorooctanoate and ammonium perfluorononanoate (see Berry, U.S. Pat. No. 2,559,752). Additional examples of such surfactants include perfluoroalkyl sulfonic acids and perfluoroalkyl ethane sulfonic acids and salts thereof wherein the surfactant can contain a mixture of perfluoroalkyl having 4–16 carbon atoms and an average of 6–12 carbon atoms (see, Khan & Morgan, U.S. Pat. No. 4,380,618), or can contain perfluoroalkyl having predominantly 6 carbon atoms (see Baker & Zipfel, U.S. Pat. Nos. 5,688,884 and 5,789,508). Additional examples of such surfactants include perfluoroalkoxy benzene sulfonic acids and salts thereof wherein the perfluoroalkyl component of the perfluoroalkoxy has 4–12 carbon atoms, preferably 7–12 carbon atoms (see Morgan, U.S. Pat. No. 4,621,116). Additional examples of such surfactants also include partially-fluorinated surfactants having internal methylene groups and having the formula $R_f$—$(CH_2)_m$—$R'_f$—COOM wherein m is 1–3, $R_f$ is perfluoroalkyl or perfluoroalkoxy containing 3–8 carbon atoms, $R'_f$ is linear or branched perfluoroalkylene containing 1–4 carbon atoms, and M is $NH_4$, Li, Na, K, or H (see Feiring et al., U.S. Pat. No. 5,763,552). Preferably, the surfactant that is not polyether does not have an ether linkage. Preferred such surfactants include perfluoroalkyl carboxylic acids and salts thereof and perfluoroalkyl ethane sulfonic acids and salts thereof. While more than one such surfactant can be used, normally only one is used.

The perfluoropolyether (PFPE with carboxyl ends) used in this invention can have any chain structure in which oxygen atoms in the backbone of the molecule are separated by saturated fluorocarbon groups having 1–3 carbon atoms. More than one type of fluorocarbon group may be present in the molecule. Representative structures are

 (I)

 (II)

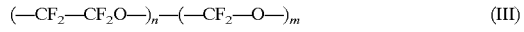 (III)

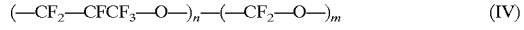 (IV)

These structures are discussed by Kasai in J. Appl. Polymer Sci. 57, 797 (1995). As disclosed therein, such PFPE can have a carboxylic acid group or salt thereof ("carboxylic group") at one end or at both ends. For monocarboxyl PFPE, the other end of the molecule is usually perfluorinated but may contain a hydrogen or chlorine atom. PFPE having a carboxyl group at one or both ends that can be used in the present invention have at least 2 ether oxygens, more preferably at least 4 ether oxygens, and even more preferably at least 6 ether oxygens. Preferably, at least one of the fluorocarbon groups separating ether oxygens, and more preferably at least two of such fluorocarbon groups, has 2 or 3 carbon atoms. Even more preferably, at least 50% of the fluorocarbon groups separating ether oxygens has 2 or 3 carbon atoms. Also, preferably, the PFPE has a total of at least 9 carbon atoms. While more than one PFPE having a carboxyl group at one or both, ends can be used, normally only one such PFPE is used.

The amount of total fluorosurfactant used in the process of the invention can be within known ranges, which include the customary amount of 0.1–0.15 wt % recited above. Thus, the amount of total surfactant can be from about 0.01 wt % to about 10 wt %, preferably 0.05–3 wt %, more preferably 0.05–035 wt %, based on the amount of water used in the polymerization. The concentration of surfactant(s) that may be employed in the polymerization process of the present invention may be above or below the critical micelle concentration (c.m.c.) of the surfactant. The c.m.c. is different for different surfactants. For example, c.m.c is about 14 g/L for ammonium perfluorooctanoate and 1 g/L for a perfluoroalkyl ethane sulfonic acid such as Zonyl® TBS or Zonyl® 6,2-TBS (c.m.c. values determined at room temperature).

As one skilled in the art will recognize, the amount of surfactant required to achieve a given level of dispersion stability will increase with the amount of polymer to be made at constant particle size. The amount of surfactant required for stability also increases with decreasing particle diameter at constant polymer made, since total surface area increases under these conditions. This is observed in some instances for the process of the present invention, which generally yields smaller dispersion particles than a similar process carried out in the absence of PFPE having carboxyl ends. In such instances, if total surfactant is not increased, the resultant dispersion can be unstable at room temperature and form a gel. Surprisingly, resultant dispersions that are unstable at room temperature appear to be stable at elevated temperatures used in polymerization, as judged by the small amount of coagulum in the reactor. "Coagulum" is non-water-wettable polymer that can separate from the aqueous dispersion during polymerization. The amount of coagulum formed is an indicator of dispersion stability.

A While PFPE having carboxyl ends can be present in major amount in the dispersant combination, such compounds are costly. Of the total fluorosurfactant, PFPE having carboxyl end groups preferably is present in minor amount, i.e., less than half of total fluorosurfactant by weight. The amount of PFPE having carboxyl ends is more preferably no more than 20 wt %, most preferably no more than 10 wt %, based on weight of total fluorosurfactant. Generally, the amount of PFPE having carboxyl ends present is at least 0.25 wt %, preferably at least 0.5 wt %, based on the weight of total fluorosurfactant. The amount of PFPE having carboxyl endgroups that is used will depend on the level of effect (i.e., the particle size) desired. Surprisingly, the use of PPPE having carboxyl ends alone, e.g., in the absence of fluorosurfactant having at most one ether linkage (not polyether), does not yield improved results compared to the use of fluorosurfactant having at most one ether linkage alone. That is, the use of a combination of at least two fluorosurfactants, at least one of the fluorosurfactants being perfluoropolyether carboxylic acid or salt thereof and at least one of the fluorosurfactants being fluoroalkyl carboxylic or sulfonic acid or salt thereof, or fluoroalkoxy aryl sulfonic acid or salt thereof provides a synergistic effect to the polymerization process, as compared to the use of either type of surfactant alone.

As used herein, "combination of fluorosurfactants" means that the components of the "combination" are present in the reactor during polymerization. The components can be introduced separately, including at different times, and need lot be physically combined prior to introduction into the reactor, although they may be so combined. All of the fluorosurfactant may be added to the reactor before polymerization is begun or the addition can be split between a reactor precharge and a later addition, typically after most of the particle nucleation has occurred. The addition of the PFPE is preferably with the precharge.

Fluorinated monomers, i.e., monomers containing at least 35 wt % fluorine, that can be polymerized in the process of this invention include fluoroolefins having 2–10 carbon atoms, fluorinated dioxoles, and fluorinated vinyl ethers of the formula $CY_2=CYOR$ or $CY_2=CYOR'OR$ wherein Y is H or F, and —R, and —R'— are independently completely-fluorinated or partially-fluorinated alkyl land alkylene groups containing 1–8 carbon atoms. Preferred —R groups contain 1–4 carbon atoms and are preferably perfluorinated. Preferred —R'— groups contain 2–4 carbon atoms and are preferably perfluorinated. Preferred fluoroolefins have 2–6 carbon atoms and include TFE, hexafluoropropylene (HFP), chlorotrifluoroethylene (CTFE), vinyl fluoride, vinylidene fluoride ($VF_2$), trifluoroethylene, hexafluoroisobutylene, and perfluorobutyl ethylene. Preferred cyclic fluorinated monomers include perfluoro-2,2-dimethyl-1,3-dioxole (PDD) and perfluoro-2-methylene-4-methyl-1,3-dioxolane (PMD).

The fluoromonomer may be polymerized alone to form a homopolymer if the fluoromonomer can be homopolymerized, or may be polymerized with one or more other fluoromonomers or other monomers, such as hydrocarbon monomers that are not fluoromonomers, to form a copolymer. If a copolymer is to be formed, the monomers chosen must be able to copolymerize. Fluorine-free monomers that copolymerize with some combinations of fluoromonomers include propylene and ethylene. Examples of useful homopolymers from fluoropolymers include polytetrafluoroethylene (PTFE) and polyvinylidene fluoride. Also usually classed with homopolymer PTFE are the modified PTFE polymers containing fluoromonomers other than TFE in such minor amounts that the modified polymers retain the non-melt-fabricable character of high molecular weight PTFE. Examples of useful copolymers include the copolymers of TFE with HFP and/or perfluoro(alkyl vinyl ethers) such as PPVE or PEVE, copolymers of TFE with PMVE, copolymers of TFE with PDD, and copolymers of TFE or CTFE with ethylene. Further examples include the copolymers of vinylidene fluoride with HFP, or with HFP and TFE. As implied above, copolymers may contain additional monomers beyond those named TFE/ethylene copolymers, for example, are most useful if they include additional monomers that introduce bulky side groups such as PFBE, HFP, PPVE or 2-trifluoromethyl-3,3,3-trifluoro-1-propene, and elastomeric polymers frequently include low concentrations of cure site moieties derived from a cure site monomer.

The polymers of this invention include TFE and CTFE homopolymers; TFE or CTFE polymerized with one or more other fluoromonomers described above such that said fluoromonomers are <1% by weight of the total polymer (wt. %); TFE or CTFE polymerized with 1 to 99 wt. % of one or more other fluoromonomers, preferably 1 to 50 wt. % of one or more other fluoromonomers, more preferably 1 to 20 wt. % of one or more other fluoromonomers, and most preferably 1 to 10 wt. % of one or more other fluoromonomers. In all cases, the wt. % values refer to the amount of comonomer incorporated in the polymer.

Preferred fluoropolymers include the group of tetrafluoroethylene (TFE) polymers. Preferred TFE polymers include perfluoropolymers, particularly TFE homopolymers and copolymers of TFE and one or more of perfluoroolefins having 3–8 carbon atoms, especially HFP, and perfluoro (alkyl vinyl ethers) having alkyl groups containing 1–5 carbon atoms, especially 1–3 carbon atoms.

Fluoropolymers made by the process of this invention can be plastic or elastomeric. They can be amorphous or partially crystalline, melt-fabricable or non-melt-fabricable. As used herein, "plastic" has its normal meaning, i.e., that the fluoropolymer will undergo plastic deformation and not recover completely from large deformation. By "elastomeric" is meant that the fluoropolymer is an elastomer or can be cured to be an elastomer as usually defined, i.e., that after being stretched to twice its initial length and released will return to substantially its original length.

Fluoropolymers made by the process of this invention can also contain units derived from monomers that introduce functional groups into the polymer to modify surface characteristics, to provide cross-linking sites, and the like. Functional monomers that introduce pendant side groups having such functionality can have the general formula $CY_1Y_2=CY_3-Z$ wherein each Y is independently H, F or Cl, and Z contains a functional group. Preferably, each Y is F and —Z is —$R_f$—X, wherein $R_f$ is a fluorinated diradical and X is a functional group that may contain $CH_2$ groups. Examples of such functional monomers include bromotetrafluorobutene. Examples of functional monomers also include fluorovinylethers such as $CF_2=CF[OCF_2CF(CF_3)]_m$—$O$—$(CF_2)_nCH_2OH$ as disclosed in U.S. Pat. No. 4,982,009 and the alcoholic ester $CF_2=CF[OCF_2CF(CF_3)]_m$ —$O$—$(CF_2)_{n-(CH2)_p}$—$O$—$COR$ as disclosed in U.S. Pat. No. 5,310,838. Additional fluorovinylethers include $CF_2=CF[OCF_2CF(CF_3)]_mO(CF_2)_nCOOH$ and its carboxylic ester $CF_2=CF[OCF_2CF(CF_3)]_mO(CF_2)_nCOOR$ disclosed in U.S. Pat. No. 4,138,426. In these formulae, m=0–3, n=1–4, p=1–2 and R is methyl or ethyl. Preferred such fluorovinylethers include $CF_2=CF$—$O$—$CF_2CF_2$—$SO_2F$; $CF_2=CF[OCF_2CF(CF_3)]O(CF_2)_2$—Y wherein —Y is —$SO_2F$, —CN, or —COOH; and $CF_2=CF[OCF_2CF(CF_3)]O(CF_2)_2$—$CH_2$—Z wherein —Z is —OH, —OCN, —O—(CO)—$NH_2$, or —$OP(O)(OH)_2$. When the purpose is to modify surface characteristics or to provide cross-linking sites, such functional monomers are usually incorporated into the fluoropolymer in minor amount, such as 5 mol % or less, more commonly 3 mol % or less, based on total monomer units in the fluoropolymer. Larger amounts of functional monomer can be incorporated into the polymer for other purposes, e.g., when the copolymer is a precursor to an ion exchange polymer.

The process of the present invention can be used to polymerize tetrafluoroethylene (TFE) to make TFE polymers, i.e., polymers comprising TFE, having high molecular weight or relatively low molecular weight. TFE may be the only monomer used, in which case the polytetrafluoroethylene (PTFE) formed will be homopolymer. Alternatively, an amount of copolymerizable perfluorinated comonomer other than TFE can be added to the reactor to copolymerize with the TFE wherein the resultant high molecular weight TFE polymer is modified with less than 0.5 mol % of the comonomer to impart at least improved film forming properties upon sintering, while still retaining the PTFE character of the polymer (modified PTFE). The PTFE may be non-melt-fabricable, i.e., it will have a melt viscosity (MV) exceeding $1 \cdot 10^8$ Pa·s at 380° C. MV in this range is measured at 380° C. by the tensile creep method described U.S. Pat. No. 3,819,594, the test samples being molded and sintered according to ASTM D-4895. Chain transfer agent, such as ethane or methanol, can be present during the polymerization reaction to provide PTFE having lower MV, e.g., 10 Pa·s to $1 \cdot 10^5$ Pa·s measured at 372° C. Such Ptfe is commonly known as micropowder, which is described, for example, in ASTM Standard D-5675. Comonomer, if present, will preferably be perfluoro(alkyl vinyl ether), wherein the alkyl group contains 1 to 8 carbon atoms, preferably 1–3 and more preferably 2 or 3 carbon atoms, perhaloolefin such as chlorotrifluoroethylene, perfluoroolefin such as hexafluoropropylene, or perfluoroalkyl olefin such as perfluorobutyl ethylene. More than one modifying comonomer can be used. When TFE is polymerized according to the process of this invention, pressure is typically in the range of 0.3 to 7 MPa and TFE is usually pressured into the reactor at a rate to maintain pressure at a target value. The polymerization is carried out to achieve the desired polymer solids concentration in the aqueous dispersion, e.g. 20 to 60% based on the combined weight of water and polymer solids, and the polymerization is stopped by stopping the TFE feed and venting the reactor to remove unreacted monomer, optionally allowing the reaction to continue for some time after stopping TFE feed and before venting.

When the polymerization process of this invention is used to make a melt-fabricable TFE copolymer, the amount of comonomer added to the reactor will be effective to incorporate sufficient comonomer into the TFE copolymer to reduce the melting point substantially below that of PTFE or modified PTFE, e.g., to 320° C. or less, and to make it melt fabricable, which amount will depend on the reactivity of the comonomer relative to TFE and the amount of incorporation necessary to impart melt-fabricability to the copolymer, this too depending on the particular comonomer used. Generally, the amount of comonomer incorporated into a melt-fabricable partially-crystalline TFE copolymer will be at least 0.5 mol % and may be as high as 15 mol % and even higher, depending on the comonomer. The goal of melt fabricability is demonstrable by the copolymer being processible by one or more melt-processing techniques such as extrusion, injection molding, compression molding and the like. Typically, the TFE copoly mer will have an MV in the range of 10 Pa·s to $10^6$ Pa·s. MV is determined by ASTM method D-1238, modified as disclosed in U.S. Pat. No. 4,360,618. The amount of copolymerizable comonomer used will usually be added to the reactor prior to the start of the polymerization reaction, but may also be added during the reaction if desired. One skilled in the art will recognize that a variety of comonomers can be used with TFE to achieve melt-fabricable TFE copolymer, and this variety can be used in the process of the present invention. Examples of copolymerizable perfluorinated monomers include perfluoroolefins such as HFP, or perfluoro(alkyl vinyl ether) (PAVE) wherein the alkyl group contains 1 to 8 carbon atoms, preferably 1–3 carbon atoms. More than one comonomer may be incorporated into the TFE copolymer, which, for example, may be a copolymer of TFE with HFP and one or more PAVE. Representative TFE/HFP copolymers (FEP) and TFE/PAVE copolymers (PFA) are described, for example, in ASTM Standards D-2116 and D-3307.

Other TFE polymers include VF2/HFP/TFE copolymers. As known in the art, such fluoropolymers may be plastic or elastomeric depending on the proportions of monomer types incorporated into the copolymer.

The benefit of the surfactant mixture in the polymerization process of the present invention is evident in the examples in reduced raw dispersion particle size (RDPS) and/or in the formation of rod-shaped dispersion particles. RDPS can be surprisingly small, even smaller than 20 nm, as shown by examples to follow. When the polymer is a TFE polymer and the dispersion particles are predominantly spherical, RDPS can be in the range of from about 5 nm to about 250 nm, preferably 10–200 nm, and more preferably 25–150 nm. Small spherical particles are obtained with copolymers that contain more than about 0.3 mole % (0.5 wt %) comonomer, with TFE homopolymer or copolymers that have a low molecular weight (measurable melt flow). The small spherical particles of low molecular weight PTFE are in contrast to the rod-like particles reported by Seguchi et al. and Folda et al. from the polymerization of low molecular weight PTFE in the presence of high concentrations, i.e. above the c.m.c, of conventional soap. When those batches of high molecular weight TFE particles of our invention that contain rods also contain spherical particles, those spherical particles have reduced diameter. High molecular weight TFE polymers that contain more than about 0.3 mole % comonomer consist of almost exclusively spherical particles of reduced diameter, i.e. less than 150 nm. The amount of dispersing agent used, and the proportion in the total amount of surfactant of PFPE having carboxyl ends, are effective to achieve the dispersion of polymer particles and preferably the preferred particle size within the range recited above. For example, when spherical particles of low molecular weight TFE copolymers are desired, the amount of PFPE having carboxyl ends is about 0.4–20% of the total amount of fluorosurfactant present.

Rod-shaped dispersion particles (length to diameter, or L/D, ratios of greater than 3.0) may be formed if the molecular weight of the TFE polymer is high (not melt fabricable) and the amount of comonomer, if any, is small, that is not more than 0.3 mole %. Dispersion particles with L/D values of greater than 3.0 are sometimes formed during prior art polymerization of high molecular weight TFE polymers but the levels are generally low, about 10 to 15%, and the L/D Values are low, less than 10, usually less than 5, unless the fluorosurfactant level is very high, generally higher than the surfactant c.m.c. value. The addition of PFPE having carboxyl ends to the polymerization allows more rod formation and high L/D values, especially with surfactant levels less than the c.m.c. A reduced amount of PFPE having carboxyl ends can be used with the split addition technique wherein most (more than 50%) of the other fluorosurfactant is added after most of the particle nucleation has occurred (usually after about 10 minutes of polymerization). When high molecular weight TFE polymer with rod-shaped dispersion particles is wanted, the amount of PFPE having carboxyl ends is typically 0.2–10% of the total fluorosurfactant.

Surprisingly, the effects on dispersion particle size and shape can be obtained with the process of the present invention even though the surface tension, as measured at room temperature, of water containing the dispersing agent is not significantly reduced, if at all, by the presence of PFPE having carboxylic acid or salt thereof. For example, the surface tension at room temperature of perfluorohexyl ethane sulfonic acid (6,2-TBS, see Examples below) in water is 26.6 dyne/cm when the 6,2-TBS concentration is 0.094 wt % and 64.4 dyne/cm when the 6,2-TBS concentration is 0.0012 wt %. When a PFPE having carboxylic ends (PFPE-1, see Examples below) is present at concentrations equal to 15% of the 6,2-TBS concentrations, the corresponding surface tensions are 26.5 dyne/cm and 67.8 dyne/cm, respectively. Thus, while the term "fluorosurfactant" is applied herein to the PFPE having carboxylic ends, they appear not to be powerful surfactants.

Another embodiment of the present invention is a fluoropolymer aqueous dispersion having substantially-spherical small particles and a low concentration of fluorosurfactant. Fluoropolymers that can be present in such dispersion include the fluoropolymers disclosed above. Preferred such fluoropolymers include either melt-fabricable or non-melt-fabricable TFE copolymers and low molecular weight PTFE (micropowder) as disclosed above. By "substantially-spherical" is meant than the average ratio of the maximum to the minimum dimensions of particles in an electron micrograph of a dried dispersion specimen is no more than 1.5, using at least 20 particles selected at random to compute the average. By "small particle size" is meant that the average size off polymer particles, measured as hereinafter described, is no more than 150 n, preferably no more than 75 nm, and more preferably no more than 50 nm. By "low concentration of fluorosurfactant" is meant that the total amount of fluorosurfactant present is less than the critical micelle concentration for said fluorosurfactant, preferably no more than 0.35 wt %, more preferably no more than 0.25 wt % and most preferably no more than 0.20 wt %, based on the total weight of water in the dispersion. As recited above, the total amount of fluorosurfactant present is at least 0.01 wt %, preferably at least 0.05 wt %. Thus, the total amount of fluorosurfactant can be in the range of 0.01–0.35 wt %, preferably in the range of 0.05–0.25 wt.%, and more preferably in the range of 0.05–0.20 wt %, based on the weight of water in the dispersion. Surprisingly, such dispersions can have a high content of fluoropolymer solids. The fluoropolymer dispersions of the invention have at least 20 wt % solids based on total weight of dispersion, preferably at least 25 wt % solids. Solids content can be even higher, e.g., 30 wt % or more.

Another embodiment of the present invention is a fluoropolymer aqueous dispersion having particles that are substantially rod-shaped and having a low concentration of fluorosurfactant. Fluoropolymers that can be present in such dispersion include the high molecular weight PTFE and modified PTFE as described above. By "substantially" in this context is meant that at least 10%, preferably at least 30%, and more preferably 75%, of the particle volume in an electron micrograph of a dried dispersion specimen are rod-shaped. By "rod shaped" is meant than the average ratio of the maximum to the minimum dimensions of particles in an electron micrograph of a dried dispersion specimen is at least 3, preferably at least 5, and more preferably at least 10. By "low concentration of fluorosurfactant" is meant that the total amount of fluorosurfactant present is less than the critical micelle concentration for said fluorosurfactant, preferably no more than 0.35 wt % and more preferably no more than 0.30 wt % based on the total weight of water in the dispersion. The total amount of PFPE having carboxyl ends present is at least 0.0025 wt % and preferably at least 0.01 wt % based on the total weight of water in the dispersion. The PFPE having carboxyl ends is preferably all precharged to the reactor whereas only a small portion of the other fluorosurfactant is precharged. The remainder of the other fluorosurfactant is preferably added after particle nucleation is largely-complete, typically after 10 minutes of reaction have occurred. This "split" addition of the other fluorosurfactant allows less of the PFPE having carboxyl ends to be used. Surprisingly, such dispersions can have a high content of fluoropolymer solids. The fluoropolymer dispersions of this embodiment of the invention have at least 20 wt % solids based on total weight of dispersion, preferably at least 25 wt % solids. Solids content can be even higher, e.g., 30 wt % or more. Also surprisingly, the resins having a rod-like shape can have a high molecular weight. The molecular weight of these resins can be in excess of $1 \cdot 10^6$, preferably in excess of $3 \cdot 10^6$.

Fluoropolymers made by the process of this invention can be used in dispersion form for various applications such as metal coating, glass cloth coating, impregnation, and the like. The as-polymerized (raw) dispersion may be used as discharged from the reactor if it has adequate stability and/or wetting characteristics for the intended purpose. Alternatively, the raw dispersion can be adjusted by addition of surfactants, diluted, or concentrated and stabilized by techniques well known in the art. Dispersion concentrations can vary over a broad range, such as from about 10 wt % solids to about 70 wt % solids, based on combined weight of polymer solids and aqueous medium.

Alternatively, the polymer particles produced by the dispersion polymerization process of this invention can be isolated from the aqueous raw dispersion by any convenient means, such as vigorous agitation, optionally supplemented by addition of electrolyte and/or water-immiscible solvent having low surface tension, or by freeze-thaw procedures, following by separation of polymer solids from the liquid and by drying.

The surprising benefit of the surfactant mixture in the polymerization process of the present invention is also evident in the examples to follow in ways that reflect the chosen method of controlling the polymerization. As, outlined above, one method of controlling a polymerization is to vary the intensity of agitation (agitator speed) to regulate mass transfer of gaseous monomer(s) into the aqueous medium to achieve a predetermined rate of polymerization (monomer consumption). Under such a control scheme, all reactions would run at the same rate if the range of agitator speeds is sufficiently broad, and variations in reactivity would be reflected in the speed of agitation necessary to maintain the desired rate, with lower agitator speed indicating higher reactivity. If one chose to run at constant agitator speed, then inherent differences in polymerization rate would be seen directly.

The benefit of the surfactant mixture in the polymerization process of the present invention is also evident in the examples to follow in surprisingly increased comonomer incorporation. For example, in polymerizations to make TFE/HFP copolymer, the amount of HFP incorporated into the copolymer is substantially higher for the process of the invention than for a similar process that does not use the surfactant mixture including PFPE having carboxyl ends. When HFP content is sufficiently high that the TFE/HFP copolymer is amorphous, the process of the present invention permits achievement of high MV more readily than the process of WO96/24625.

EXAMPLES

Fluorosurfactants used in the examples below are described in Table 1, and are generally identified by the code given in the Table.

TABLE 1

Fluorosurfactants

| Code | Description |
|---|---|
| C-8 | Ammonium perfluorooctanoate |
| TBS | $F(CF_2CF_2)_mCH_2CH_2$—$SO_3M$, m = 2-8 mixture (Zonyl ® TBS fluorochemical surfactant, DuPont) |
| 6,2-TBS | $C_6F_{13}$—$CH_2CH_2$—$SO_3H$ (Zonyl ® FS-62 fluorochemical surfactant, DuPont) |
| PFPE-1 | $CF_3CF_2CF_2$—O—(—$CFCF_3$—$CF_2$—O—)$_n$— $CFCF_3$—COOH (Krytox ® 157 FSL fluorinated oil, DuPont) |
| PFPE-2 | $CF_3CF_2CF_2$—O—(—$CFCF_3$—$CF_2$—O—)$_p$— $CFCF_3$—COOH (Krytox ® 157 FSH fluorinated oil, DuPont) |
| PFPE-3 | HOOC—$CF_2$—O—(—$CF_2CF_2$—O—)$_q$—(—$CF_2O$—)$_r$— $CF_2$—COOH (Fomblin ® Fluorolink ® C, Ausimont) |
| PFPE-4 | $CF_3CF_2CF_2$—O—(—$CF_2CF_2CF_2$—O—)$_s$— $CF_2CF_2$—COOH (Demnum ® SH perfluoropolyether oil, Daikin) |
| PFPE-5 | F—(—$CFCF_3$—$CF_2$—O—)$_t$—$CF_2CF_3$ (Krytox ® 1506 vacuum pump fluid, Dupont) |

Average size of polymer particles as polymerized, i.e., raw dispersion particle size (RDPS), is measured by photon correlation spectroscopy (PCS) or by measurement on scanning electron micrographs (SEM) of dispersion specimens deposited on polished silicon wafers and dried. The PCS method assumes a spherical particle shape and is inadequate for measurement of the dispersions that contain substantially non-spherical (rod) shaped particles.

The volume percent of rods in a dispersion sample is determined by drying a portion of the dispersion on a silicon wafer, using an ion beam sputtering systemn to coat it under a vacuum with 2 nm of iridium, and then examining it by scanning electron microscope (SEM). A transparent grid is laid over approximately 5"×8" SEM photographs, typically taken at 20,000× magnification. The grid is divided into 1" sections and further into ⅛" squares. Two square inches (256 sub-sections) of photographs are examined and the percentage of sub-sections is calculated which contained rod-shaped particles. Sub-sections that contain no particles or in which overlapping particles prevent accurate judgement of particle shape (L/D) are excluded from the calculation. The results are reported as the "volume percent" rods.

The solids content of aqueous dispersions is determined by evaporating a dispersion specimen to dryness, or by use of a hydrometer to determine specific gravity, and is stated in wt % based on combined weights of liquid medium and dispersed solids.

Fluoropolymer compositions are determined by infrared spectroscopy on 0.025–0.051 mm thick melt-pressed films. For TFE/HFP copolymers which contain more than 1 weight % HFP, Fourier transform infrared spectroscopy is employed according to the method described in U.S. Pat. No. 4,380,618. In applying this method, the peak absorbances of bands found at about 10.18 $\mu$m and at about 4.25 $\mu$m are used, not the absorbances at these exact wavelengths unless they are also the peak absorbances. HFP content is expressed as an index HFPI, the ratio of the two peak absorbances. For TFE/HFP copolymers that contained less than 1 weight % HFP, the method of Cardinal, U.S. Pat. No. 3,142,665, is employed to determine the HFP level.

The PAVE content of TFE melt-fabricable copolymers is determined by FTIR spectroscopy on 0.095–0.105 mm thick films pressed at 150°–350° C. depending on the melting point, or absence thereof, of the resin being analyzed. PMVE, is determined from an infrared band at 11.24 $\mu$m and is calculated in wt % as 8× the ratio of the 11.24 $\mu$m absorbance to 4.25 $\mu$m absorbance. For PMVE determination, the baseline for the absorbance at 11.24 $\mu$m is taken as the minimum absorbance at 10.36 $\mu$m. PPVE is determined from an infrared band at 10.1 $\mu$m and is calculated in wt % as 0.97× the ratio of the 10.1 $\mu$m absorbance to 4.25 $\mu$m absorbance. The low level of PPVE content (less than 1%) in the non-melt-fabricable TFE copolymers is determined by the procedure of U.S. Pat. No. 4,879,362.

Melt flow rate (MFR) of fluoropolymers having MV in the range 10 Pa·s to $10^6$ Pa·s is determined by ASTM method D1238-52T modified as described in U.S. Pat. No. 4,380,618, except that an orifice having 0.062 inch (1.6 mm) diameter and weights of 833 g or 325 g are used for samples having low MV (less than $10^3$ Pa·s). MV is inversely related to MFR by an expression that depends on the test conditions and the melt density of the resin. For FEP resins, for example, the relationship is MV=53.15/MFR when the measurement is made according to ASTM D1238, MV is in units of $10^3$ Pa·s and MFR is in units of g/10min. MV greater than about 1–$10^8$ Pa·s at 380° C. are measured at 380° C. by the tensile creep method described U.S. Pat. No. 3,819,594, the test samples being molded and sintered according to ASTM D-4895.

Thermal characteristics of fluoropolymer resins are determined by differential scanning calorimetry (DSC) by the method of ASTM D-4591-87. As is conventional, melting temperature ($T_m$) is taken as the peak temperature of the melting endotherm.

Standard specific gravity (SSG) of PTFE resin is measured by the method of ASTM D-4895. Polymer number average molecular weight (MW) is inversely proportional to SSG and can be calculated from SSG values by the correlation described by S. V. Gangal, *Encyclopedia of Polymer Science and Engineering*, 16, 2nd Edition, John Wiley & Sons, 577–599 (1989), "Tetrafluoroethylene Polymer":

$$SSG = 2.612 - 0.058 \cdot \log_{10} MW$$

Specific surface area (SSA) is measured according to the method of ASTO D-5675. Higher SSA values normally indicate a smaller fundamental particle size. However, an alteration in the particle shape, such as the formation of rod-like particles, makes this correlation more complicated.

Unless otherwise stated, concentrations of solutes in solutions are based on combined weights of solute and solvent.

Control A

A cylindrical, horizontally disposed, water jacketed, paddle-stirred, stainless steel reactor having a length to diameter ratio of about 1.5 and a water capacity of 79 parts by weight is charged with 47.4 parts of demineralized water. The reactor is heated to 65° C., evacuated, purged with TFE, and then evacuated again. The vacuum in the reactor is then used to draw in 1.87 parts of a 4.7 wt % solution of 6,2-TBS surfactant in water. The solution is rinsed into the reactor with another 0.88 part of water. The reactor is then sealed, agitation is begun at 42 rpm, and the reactor temperature is raised to 103° C. After the temperature has become steady at 103° C., HFP is added slowly to the reactor until the pressure is 475 psig (3.38 MPa). The pressure in the reactor is then increased to 650 psig (4.59MPa) by the addition of TFE. Then 0.66 part of a freshly prepared aqueous solution containing 3.0 wt % of ammonium persulfate (APS) is pumped into the reactor at the rate of 0.11 part/min. Thereafter, the same initiator solution is pumped to the reactor at the rate of 0.024 part/min for the remainder of the polymerization. After polymerization has begun (kickoff) as indicated by a 10 psig (0.07 MPa) drop in reactor pressure, additional TFE is added to the reactor to maintain the pressure constant at 650 psig (4.58 MPa). The agitator speed is used to control the TFE mass transfer into the aqueous phase so that the TFE addition rate is about 0.13 part/min. Agitator speed is limited to a maximum of 70 rpm to avoid destabilizing the dispersion. When a total of 18.0 parts of TFE have been added after kickoff (150 min), the TFE feed is stopped and the reactor is cooled. The average agitation speed during polymerization is 58 rpm. When the reactor contents have cooled to 90° C., the initiator feed and the agitation are stopped and the reactor is vented. After venting to nearly atmospheric pressure, the reactor is purged with nitrogen to remove residual monomer. The dispersion, which is found to contain 32.8 wt % polymer, is then discharged from the reactor and saved. The raw dispersion particle size (RDPS) is 150 nm.

A portion of the dispersion is poured into a plastic bottle that is then placed in a freezer at −20° C. overnight. The bottle of dispersion is then thawed in a bucket of warm water and the polymer phase which separates is collected on a filter. The polymer is washed on the filter three times with a volume of demineralized water equivalent to 75% of the original dispersion volume. It is then washed three times with similar amounts of isopropyl alcohol. Much of each wash liquid is removed by application of a vacuum to the bottom of the filter. The polymer is then dried at 150° C. in a circulating air oven. The dried resin has an MV of $1.7 \cdot 10^2$ Pa·s and an HFPI of 4.71.

EXAMPLE 1

The procedure of Control A is essentially repeated except that 0.011 part of PFPE-1 is added with the 6,2-TBS surfactant solution. The required reaction time is 140 min with an average agitator speed of 37 rpm. The dispersion contains 33.9 wt % polymer solids, and RDPS is 65 nm. MV is $1.5 \cdot 10^2$ Pa·s and HFPI is 5.48. Thus, with PFPE having carboxyl end groups present at only 11% of total surfactant, HFP incorporation increases while reaction time is reduced at lower average agitator speed, and RDPS is reduced.

EXAMPLE 2

The procedure of Control A is essentially repeated except that 0.011 part of PFPE-2 is added with the 6,2-TBS surfactant solution. The required reaction time is 140 min with an average agitator speed of 41 rpm. The dispersion contains 33.5 wt % polymer solids, and RDPS is 90 nm. MV is $1.4 \cdot 10^2$ Pa·s and HFPI is 5.88. Again, with PFPE having carboxyl end groups present at only 11% of total surfactant, HFP incorporation increases while reaction time is reduced at lower average agitator speed, and RDPS is reduced.

Control B

The procedure of Control A is essentially repeated except that 0.011 part of PFPE-5 (no carboxylic acid ends) is added with the 6,2-TBS surfactant solution. The required reaction time is 151 min with an average agitator speed of 65 rpm. The dispersion contains 33.8 wt % polymer solids and RDPS is 175 nm. MV is $1.6 \cdot 10^2$ Pa·s and HFPI is 4.58. Thus, PFPE lacking carboxyl end groups has no positive effect on rate or on HFP incorporation, nor is RDPS reduced.

EXAMPLE 3

The procedure of Example 1 is essentially repeated except that only 0.002 part of PFPE-1 is added. The required reaction time is 137 min with an average agitator speed of 42 rpm. The dispersion contains 32.6 wt % polymer solids and RDPS is 104 nm. The resin MV is $1.6 \cdot 10^2$ Pa·s and HFPI is 5.52. Thus, even with PfPe having carboxylic acid ends present at only 2.3% of total surfactant, HFP incorporation increases relative to Control A while reaction time is reduced at lower average agitator speed, and RDPS is reduced.

Control C

The procedure of Control A is essentially repeated except that the initial HFP pressure is 495 psig (3.52 MPa), the initiator solution precharge is 1.10 parts, the TFE addition rate is reduced to about 0.086 part/min, and the initiator solution is pumped to the reactor during polymerization at a rate of 0.017 part/min. The reaction time is 212 min with an average agitator speed of 66 rpm. The dispersion contains 32.9 wt % polymer solids and RDPS is 165 nm. MV is $2.2 \cdot 10^2$ Pa·s and HFPI is 5.47, a compositional result similar to those of Examples 1 and 3 which have lower HFP pressure, lower agitator speed, and shorter reaction time.

Control D

The procedure of Control A is essentially repeated except that the surfactant solution contains 0.11 part of PFPE-1 and no 6,2-TBS. Although the goal TFE addition rate is 0.13 part/min (reaction time of 140 min), this rate can not be achieved with the maximum agitation rate of 70 rpm. The final reaction time is 214 min. The product dispersion contains 28.7 wt % polymer solids and RDPS is 335 nm. Over 11 parts of wet polymer coagulum are found in the reactor after the dispersion has been drained off. MV is $3.1 \cdot 10^2$ Pa·s and HFPI is 4.76. Thus, when the surfactant of Control A is entirely replaced with the PFPE having carboxyl ends that produces significant improvement when present in minor amount in Examples 1 and 3, no improvement in HFP incorporation is seen, reaction rate is lower, RDPS is larger, and dispersion stability is poor as indicated by the low solids content of the dispersion and the large amount of coagulum.

EXAMPLE 4
and

Control E

The procedure of Example 1 is essentially repeated except that the concentration of 6,2-TBS solution is 5.9 wt % and only 0.0006 part of PFPE-1 is added. The required reaction time is 133 min with an average agitator speed of 65 rpm. The dispersion contains 31.0 wt % polymer solids and RDPS is 127 nm. The resin MV is $1.3 \cdot 10^2$ Pa·s and HFPI is 4.97. When PFPE-1 is omitted from the recipe (Control E), the reaction time is 126 min at an agitator speed of 64 rpm, the dispersion contains 30.9 wt % polymer solids, RDPS is 142 nm, and the resin MV is $1.9 \cdot 10^2$ Pa·s and HFPI is 4.72. Thus, even with PFPE having carboxylic acid ends present at only 0.5 wt % of total surfactant, HFP incorporation increases relative to Control E.

EXAMPLE 5
and

Control F

The procedure of Example 4 is essentially repeated, except that 0.11 part of C-8 is used instead of 6,2-TBS and the amount of PFPE-1 is 0.0066 part. The required reaction time is 152 min with an average agitator speed of 36 rpm. The dispersion contains 33.5 wt % polymer solids and KDPS is 62 nm. The resin MV is $1.8 \cdot 10^2$ Pa·s and HFPI is 6.27. When PFPE-1 is omitted from the recipe (Control F), the reaction time is 171 min at an agitator speed of 63 rpm, the dispersion contains 30.2 wt % polymer solids, RDPS is 213 nm, and the resin has MV of $1.7 \cdot 10^2$ Pa·s and HFPI 4.96. Thus, the process of the present invention yields smaller particle size and increased HFP incorporation at increased reaction rate (Lower agitator speed) when the dispersing agent is a mixture of PFPE carboxylic acid and salt of fluoroalkyl carboxylic acid.

EXAMPLE 6

The procedure of Example 4 is essentially repeated, except that 0.011 part of PFPE-3 is used instead of PFPE-1. The required reaction time is 120 min with an average agitator speed of 49 rpm. The dispersion contains 32.8 wt % polymer solids and RDPS is 46 nn. The resin MV is $1.1 \cdot 10^2$ Pa·s and HFPI is 6.03. Thus, with reference to Control E, the process of the present invention yields smaller particle size and increased HFP incorporation at increased reaction rate (lower agitator speed) when the PFPE carboxylic acid or salt component of the dispersing agent is dicarboxylic acid.

EXAMPLE 7
and

Control G

The reactor described in Control A is charged with 50 parts of demineralized water and 1.87 parts of an aqueous solution/mixture of 3.8 wt % of 6,2-TBS (FS-62) surfactant and 0.35 wt % of PFPE-1. The container for 6,2-TBS/PFPE-1 mixture is rinsed with 0.88 part of demineralized water that is also added to the reactor. The agitator is turned on at 40 rpm and the reactor contents are heated to 65° C. The reactor is evacuated, purged with TFE, and then evacuated again. The temperature is then raised to 103° C. and the reactor is pressurized first to 410 psig (2.93 MPa) with HFP and then to 635 psig (4.48 MPa) with TFE. An aqueous solution containing 0.76 wt % of KPS and 0.70 wt % of APS is added to the reactor at a rate of 0.11 part/min for 3.4 min and then the addition rate is reduced to 0.0187 part/min for the remainder of the polymerization. The reaction kickoff is indicated by a 10 psig (0.1 7 MPa) drop in reactor pressure. With the agitation speed held constant at 40 rpm, 17.5 parts of TFE are fed to the reactor over a time of 130 min. The reactor pressure is varied between 520 and 560 psig (3.69 and 3.96 MPa) to maintain a uniform rate. When the planned TFE addition is complete, the initiator and TFE feeds are stopped and cooling water is passed through the reactor jacket. When the temperature of the reactor contents falls to 90° C., the agitator is stopped and the reactor is vented and purged as described for Control A. The dispersion contains 34.9 wt % polymer solids and RDPS is 60 nm (by SEM). For dry resin isolated from a portion of the dispersion as described in Control A, MV is $3.8 \cdot 10^3$ Pa·s and HFPI is 4.78. When PFPE-1 is omitted from the recipe (Control G), the dispersion contains 34.0 wt % polymer solids, RDPS is 140 nm (SEM), and the resin has MV of $6.1 \cdot 10^3$ Pa·s and HFP of 3.66. Thus, the process of the present invention yields smaller particle size and increased HFP incorporation when the dispersing agent is a mixture of PFPE carboxylic acid and salt of fluoroalkyl carboxylic acid. The large increase in HFP incorporation indicates that HFP, partial pressure could be reduced in the process of the invention to achieve the level of HFP in the copolymer of Control G.

EXAMPLE 8
and

Control H

The reactor of Control A is charged with 47.6 parts of demineralized water, heated to 60° C., and then evacuated and purged with TFE as in Control A. A vacuum in the reactor is then used to draw in 0.086 part of 6,2-TBS and 0.0066 part of PFPE-1 in 2.7 parts of water. The reactor is then heated to 103° C., pressured to 410 psig (2.93 MPa) with HFP and then to 600 psig (4.24 MPa) with TFE and then 0.26 part of PEVE is added to reactor in about 2 min. An aqueous solution (0.44 part) containing 0.8 wt % of APS and 0.8 wt % of KPS is added to the reactor at a rate of 0.11 part/min. The same solution is then pumped into the reactor at a rate of 0.013 part/min for the remainder of the reaction. After polymerization has begun, the pressure is maintained at 600 psig (4.2 MPa) by the addition of TFE. The agitator speed is adjusted to control the reaction rate such that 17.5 parts of TFE are added in 115 min after polymerization has begun. The average agitator speed is 42 rpm. The TFE and initiator feeds are then stopped and the reactor is cooled and vented as described for Control A. The dispersion contains 33.5% polymer solids and RDPS is 59 nm. A portion of the polymer is isolated and dried by the procedure described for Control A except that the polymer is washed only with demineralized water after filtering. The resin has MV of $4.6 \cdot 10^3$ Pa·s and HFPI of 3.90, and contains 0.76 wt % of PEVE. When PFPE-1 is omitted from the recipe (Control H) along with increase of the initial water charge to 50 parts and reduction of the water added with the surfactant to 0.24 part, the reaction time is 119 min at an average agitator speed of 58 rpm, the dispersion contains 33.8 wt % polymer solids, RDPS is 150 nm, and the resin has MV of $5.7 \cdot 10^3$ Pa·s and HFPI of 2.98 and contains 0.69 wt % of PEVE. Thus, the process of the present invention yields smaller particle size and increased HFP and PEVE incorporation at increased reaction rate (lower agitator speed) when the dispersing agent is a mixture of PFPE carboxylic acid and salt of fluoroalkyl carboxylic acid.

EXAMPLE 9 and

Control I

The reactor used in Control A is charged with 50.3 parts of demineralized water, pressure-tested and purged with TFE as in Control A, and then left at reduced pressure. A valve to an ethane cylinder is opened and ethane is fed to the reactor until the reactor pressure rises by 4 inch of mercury (13.5 kPa). The vacuum is then used to draw into the reactor 0.61 part of PPVE and then 1.87 parts of an aqueous solution of 4.7 wt % of 6,2-TBS surfactant and 0.35 wt % of PFPE-1. The solution is rinsed into the reactor with another 0.88 part of water. The reactor is sealed and agitation is begun at 50 rpm. The reactor temperature is raised to 75° C. and the reactor is then pressured to 300 psig (2.17 MPa) with TFE. Then 0.88 part of an aqueous solution of 0.22 wt % APS is pumped into the reactor at 0.11 part/min. Thereafter, an aqueous solution of 0.22 wt % APS is pumped to the reactor at 0.0088 part/min for the remainder of the polymerization. After polymerization has begun, PPVE is added to the reactor at a rate of 0.0049 part/min for the remainder of the polymerization. The reactor pressure is maintained at 300 psig (2.17 MPa) during polymerization by the addition of TFE using the agitator speed to control the mass transfer of the monomers from the gas phase into the aqueous dispersion. A total of 20 parts of TFE and 0.74 part of PPVE are added over a time of 150 min after the initial reactor pressurization, with average agitator speed of 44.3 rpm. After this addition, the monomer feed is stopped and full cooling is applied to the reactor. The agitator and the initiator feed are turned off and the reactor is vented. When the pressure has dropped below 5 psig (0.14 MPa), the reactor is purged with nitrogen. The dispersion is then discharged from the reactor and saved. The dispersion contains 28.9 wt % polymer solids having RDPS of 31 nm. A portion of the dispersion is frozen overnight in a freezer, and then thawed in a microwave oven. The polymer that separated upon thawing is collected on a filter, washed with demineralized water, and dried in a circulating air oven at 150° C. for two days. The dried resin has MV of $3.5 \cdot 10^3$ Pa·s and contains 3.58 wt % of PPVE.

When the PFPE-1 concentration in the dispersant mixture is reduced to 0.12 wt %, average agitator speed is 46.5 rpm and RDPS is 46 mn, and when increased to 0.58 wt % average agitator speed is 41.8 rpm and RDPS is 50 nm. When PFPE-1 is omitted from the recipe (Control I) the average agitator speed is 48.0 rpm, the dispersion contains 29.8 wt % polymer solids, RDPS is 146 nm, and the resin has MV of $4.2 \cdot 10^3$ Pa·s and contains 3.42 wt % of PPVE.

EXAMPLE 10

The procedure of Example 9 is followed to charge the reactor with water, ethane, and surfactant solution except that the pressure rise upon ethane addition is 3 inch of Hg (10 kPa) and the surfactant solution contains 5.9 wt % of 6,2-TBS and 0.56 wt % of PFPE-1. No PPVE is added. After the ethane addition, 4.41 parts of PMVE are added and the reactor temperature is raised to 80° C. with the agitator running at 46 rpm. The reactor is then pressured to 350 psig (2.52 MPa) with TFE and 0.55 part of a 1.0 wt % aqueous solution of APS is added at a rate of 0.11 part/min. A 0.52 wt % solution of APS is then pumped into the reactor at a rate of 0.022 part/min for the remainder of the polymerization. After polymerization kickoff, PMVE is pumped into the reactor at 0.038 part/min and TFE is added to maintain the pressure at 350 psig for the remainder of polymerization. The agitator speed is varied to achieve a reaction time of 200 min. After 12 parts of TFE and 6.49 parts of PMVE are added after kickoff, the monomer and initiator feeds and the agitator are stopped and cooling is applied to the reactor. The reactor pressure is vented and, after purging with nitrogen, the reactor is opened and the product dispersion is discharged. The dispersion contains 30.0 wt % polymer solids, and RDPS is 18 mn. The dried polymer, isolated as in Control A except that it is dried in a 60° C. vacuum oven under reduced pressure and with a nitrogen purge, has MV of $3.3 \cdot 10^3$ Pa·s and contains 37.6 wt % of PMVE. No crystalline melting point is detected by DSC, and the glass transition temperature is below room temperature. With addition of a suitable cure site monomer, this copolymer would be a curable perfluoroelastomer.

EXAMPLE 11 and

Control J

The procedure of Example 9 is essentially followed to charge the reactor with water, ethane, and surfactant solution except that only 0.22 part of PPVE is precharged and the surfactant solution contains 4.7 wt % of 6,2-TBS and 0.59 wt % of PFPE-1. After agitation is begun at 50 rpm, 0.25 part of PMVE is added and the reactor temperature is raised to 75° C. The reactor is then pressured to 300 psig (2.17 MPa) with TFE. Then 0.88 part of a 0.30 wt % aqueous solution of KPS is pumped into the reactor at 0.11 part/min. Thereafter, the same KPS solution is pumped to the reactor at 0.0077 part/min for the remainder of the polymerization. After polymerization has begun, PMVE is added to the reactor at a rate of 0.0084 part/min for the remainder of the polymerization. The reactor pressure is maintained at 300 psig (2.17 MPa) during polymerization by the addition of TFE using the agitator speed to control the mass transfer of the monomers from the gas phase into the aqueous dispersion. A total of 20 parts of TFE and 1.52 parts of PMVE are added over a time of 180 min after the initial reactor pressurization. After this addition, the monomer and initiator feeds are stopped and full cooling is applied to the reactor. The agitator is turned off and the reactor is vented. When the pressure has dropped below 5 psig (0.14 MPa), the reactor is purged with nitrogen. The dispersion is then discharged from the reactor and saved. The dispersion contains 31.2 wt % polymer solids, and RDPS is 49 nm. The dried polymer, isolated as in Control A, has MV of $8.7 - 10^3$ Pa·s and contains 7.0 wt % of PMVE and 0.70 wt % of PPVE. When PFPE-1 is omitted from the recipe (Control J), RDPS is 105 nm.

EXAMPLE 12–13 and

Control K

A reactor similar to that of Control A but having a water capacity of about 87 parts by weight is charged with 45.5 parts of demineralized water. After pressure-testing the reactor with 300 psig (2.17 MPa) nitrogen, the reactor is cooled to about 30° C. and then is alternately evacuated and purged with TFE three times. The reactor is then left under a vacuum. The vacuum is then used to draw into the reactor 1.87 parts of an aqueous solution containing 5.9 wt % of 6,2-TBS and 0.59 wt % of PFPE-3 (Fluorolink® C). A valve to an ethane cylinder is then opened and ethane is fed to the reactor until the reactor pressure rises by 0.081 MPa (24 inch of Hg). The reactor is sealed and agitation is begun at 46 rpm. The reactor temperature is raised to 90° C. and the reactor is then pressured to 300 psig (2.17 MPa) with TFE. Then 0.53 part of a 0.25 wt % aqueous solution of APS is pumped into the reactor at a rate of 0.066 part/min. Reaction kickoff, as indicated by a 10 psig (0.07 MPa) drop in reactor pressure, occurs 6 min after initiator pumping begins. Thereafter, a 0.50 wt % aqueous solution of APS is pumped to the reactor at a rate of 0.0143 part/min for the remainder of the polymerization. The reactor pressure is maintained at 300 psig (2.17 MPa) during polymerization by the addition of TFE using the agitator speed to control the mass transfer of the TFE from the gas phase into the aqueous dispersion. A total of 18 parts of TFE are added after the initial reactor pressurization over a time of 150 min. Then the TFE and initiator feeds are stopped but the reaction is allowed to continue for another 20 min while the pressure drops to about 115 psig (0.79 MPa). The agitator is then turned off, the reactor is vented, and the dispersion is then discharged from the reactor and saved. The dispersion contains 31.6 wt % polymer solids, and RDPS is 50 nm. About 1.9 parts of the dispersion and 1.9 parts of demineralized water are combined in a vessel and 0.077 part of aqueous 13.5 wt % ammonium carbonate solution is added with vigorous stirring. The polymer that separates is collected on a filter and is then dried in a 150° C. oven for two days. The MV of the dried resin is 35 Pa·s (MFR determined with 0.0625 inch orifice and 325 g weight). When PFPE-3 is replaced by a like amount of PFPE-4 (Example 13), RDPS is 63 nm and MV is 55 Pa·s. When PFPE is omitted from the recipe (Control K), RDPS is 111 nm and MV is 86 Pa·s.

EXAMPLE 14 and

Control L

The reactor described in Example 12 is charged with 48 parts of demineralized water and is then pressure-tested at 80° C. and 400 psig (2.86 MPa). The temperature is then reduced to 65° C. and evacuated and purged with TFE three times before leaving a vacuum on the reactor. The vacuum is then used to draw into the reactor 1.87 parts of an aqueous solution containing 5.9 wt % of C-8 and 1.2 wt % of PFPE-1, followed by 0.88 part of demineralized water rinse. The reactor temperature is then increased to 80° C. with the agitator running at 43 rpm. When the temperature has lined out, the reactor is pressurized to 380 psig (2.72 MPa) with TFE. Then 1.10 parts of a 0.04 wt % aqueous solution of APS are pumped into the reactor. After reaction kickoff has occurred, as indicated by a 10 psig (0.07 MPa) drop in pressure, the reactor pressure is maintained at 380 psig by the addition of TFE until a total of 15 parts of TFE have been added after kickoff. The TFE feed is then stopped but agitation is continued until the pressure drops to 185 psig (1.38 MPa). The agitator speed is reduced to 30 rpm while cooling the reactor contents to 50° C., whereupon the agitator is stopped, the reactor is vented, and the dispersion is drained from the reactor. The dispersion contains 27.2% polymer solids. SEM examination shows that the dispersion contains a mixture of spherical and rod-like particles in a numerical ratio of spheres to rods of approximately 25/75. The spherical particles are somewhat variable in size but most are less than 100 nm and at least 95% are less than 120 nm in diameter. The rod width is about 30 nm and their length is primarily in a range from about 0.4 μm up to several μm. Solids are isolated from the dispersion by the procedure of Example 12 except that the weights of dispersion, demineralized water, and ammonium carbonate solution are 2.20, 1.32, and 0.11 parts, respectively. The dry powder has SSG of 2.213 (MW=7.5·10$^6$) and SSA of 15 m$^2$/g.

When PFPE-1 is omitted from the polymerization (Control L), the product dispersion contains 27.6 wt % polymer solids and SEM shows that the dispersion particles are a mixture of spheres and rods in the approximate ratio of 90/10. The rod width is about 100 nm and most are of the order of 0.5 μm in length. The sphere diameter is typically 160 nm and is less variable than in Example 14. The SSG for the dry PTFE powder, similarly isolated from the dispersion except that the amount of ammonium carbonate solution is only 0.044 part, is 2.219 (MW=6.0·10$^6$) and SSA is 11 m$^2$/g. More electrolyte is used in Example 14 because the dispersion is more stable and, thus, more difficult to coagulate. Still, coagulation time is 20 min vs. 1.5 min for Control L.

EXAMPLE 15 to 19

The reactor described in Example 14 and Control L is charged with 48 parts of demineralized water and 0.033 parts of C-8 plus various amounts of PFPE-1 (listed in Table 2) dissolved in water to a total weight of 1.43 parts. The reactor is evacuated and purged four times with TFE, finally leaving a vacuum on the reactor. The reactor temperature is then raised to 80° C. with agitation at 46 rpm. After the temperature has leveled off at 80° C., the reactor is pressurized to 380 psig (2.72 MPa) with TFE. Then 1.10 parts of a 0.014 wt % aqueous solution of APS is added to the reactor at a rate of 0.11 parts/minute. After reaction kickoff has occurred, as indicated by a 10 psig (0.07 MPa) drop in pressure, agitation is maintained at 46 rpm, and TFE is added to the reactor to maintain the pressure at 380 psig (2.72 MPa). After 3 parts of TFE have been added after kickoff, 1.10 parts of an aqueous solution of an 8.4 wt % solution of C-8 is added at a rate of 0.11 parts/minute. After 24 parts of TFE have been added after kickoff, the TFE feed is stopped and the pressure is allowed to react down to 185 psig (1.38 MPa). The agitator speed is then reduced to 30 rpm while cooling the reactor contents to 50° C., whereupon the agitator is stopped, the reactor is vented, and the dispersion is drained from the reactor.

The resulting dispersion polymer solids and the percentages of the dispersion particles which have an L/D of greater than 3.0 are shown in Table 2 as a function of the amount of PFPE-1 which was added to the reactor. A significant level of rods are found with even only the addition of 5.5·10$^4$ parts of PFPE-1. Although some rods are found with no PFPE-1 addition, none of these rods have an L/D of greater than about 7. The weights of wet "coagulum" are also shown as a function of the amount of PFPE-1. The amount of coagulum decreases with low levels of PFPE-1. However, there may be a higher level of PFPE-1 whereupon coagulum again increases.

TABLE 2

| Example | Parts PFPE-1 | Dispersion % Solids | % Rods | Coagulum Wt. (wet) | SSG | MW |
|---|---|---|---|---|---|---|
| 15 | None | 15.8 | 13 | 28.6 parts | 2.189 | 2.0 · 10$^7$ |
| 16 | 5.5 × 10$^{-4}$ | 34.6 | 38 | 7.1 | 2.176 | 3.3 · 10$^7$ |
| 17 | 1.1 × 10$^{-3}$ | 34.8 | 46 | 3.1 | 2.179 | 2.9 · 10$^7$ |
| 18 | 2.2 × 10$^{-3}$ | 35.6 | 75 | 0.8 | 2.180 | 2.8 · 10$^7$ |
| 19* | 6.6 × 10$^{-3}$ | 35.1 | 97 | 2.4 | 2.182 | 2.6 · 10$^7$ |

*The melt viscosity of Example 19, determined by the tensile creep method, is 8.7 · 10$^9$ Pa · s.

EXAMPLE 20

The polymerization of Example 18 is repeated except that 0.05 parts of PPVE is added before the addition of TFE. The product dispersion, which contains 35.8% solids having a PPVE level of 0.03 mole %, contains 13% rod-shaped particles, most of which have an L/D of at least 20. The average dispersion particle diameter, as determined from SEM photographs, is 102 nm. The amount of coagulum is only 0.04 parts. The dry polymer powder has SSG of 2.167.

EXAMPLE 21
and

Control M

The polymerization of Example 20 is repeated except that the APS initiator concentration is 0.04 wt % and the PPVE addition is 0.10 parts. The product dispersion, which contains 32.3% solids having a PPVE content of 0.08 mole %, contains 3% rod-shaped particles. The average diameter of the spherical particles, determined from the SEM photographs, is 85 nm. The amount of coagulum is 0.22 parts. The dry polymer powder has SSG of 2.185. The melt viscosity, determined by the tensile creep method, is $2.4 \cdot 10^8$ Pa·s. When the PFPE-1 is left out of the polymerization (Control M) the amount of coagulum is 0.42 parts and the product dispersion contains less than 1% rod-shaped particles and the average spherical particle diameter is 185 nm. The dry polymer powder has SSG of 2.175.

EXAMPLE 22

The polymerization of Example 18 is repeated except the APS initiator concentration is 0.028 wt % and 0.15 parts of HFP is added before the addition of TFE. The product dispersion, which contains 35.8 wt % solids, contains no rod-shaped dispersion particles. The average spherical dispersion particle size is 90 nm. The HFP content of the product resin is 0.31 mole %. The dry polymer powder has SSG of 2.154.

EXAMPLE 23

The reactor described in Control A is charged with 46.2 parts of demineralized water and is then evacuated and purged with TFE as described for Control A. The vacuum in the reactor is then used to draw in 1.87 parts of an aqueous solution containing 4.7 wt % of TBS and 0.59 wt % of PFPE-1. The solution is rinsed into the reactor with another 0.88 part of demineralized water. The reactor is sealed, agitation is begun at 43 rpm, and the reactor temperature is raised to 103° C. After the temperature has become steady at 103° C., HFP is added slowly to the reactor until the pressure is 600 psig (4.24 MPa). The pressure is then increased to 650 psig (4.59 MPa) by the addition of TFE. Then 0.55 part of a freshly prepared 3.0 wt % aqueous solution of APS initiator is pumped into the reactor at a rate of 0.028 part/min for 20 min whereupon reaction begins. The remainder of the polymerization is carried out with the TFE and initiator solution (3.5 wt % APS in water) additions as indicated in Table 3.

TABLE 3

| Time Interval (min) | TFE Feedrate (part/min) | Initiator Feedrate (part/min solution) |
| --- | --- | --- |
| First 80 | 0.028 | 0.012 |
| Next 60 | 0.037 | 0.016 |
| Next 65 | 0.048 | 0.021 |
| Next 65 | 0.067 | 0.028 |
| Next 55 | 0.087 | 0.036 |

TABLE 3-continued

After the TFE addition indicated above is complete, the dispersion is discharged from the reactor as described for Control A. The dispersion contains 33.0 wt % polymer solids and RDPS is 33 nm. The polymer, isolated from the dispersion as is described for Control A, has MV of 290 Pa·s and an HFP of 10.5. No melting endotherm is found by DSC and thus the TFE/HFP copolymer resin is amorphous.

What is claimed is:

1. A dispersion comprising substantially-spherical fluoropolymer particles in an aqueous medium containing fluorosurfactant, said dispersion containing at least 20% solids by weight based on total weight of dispersion, said particles having average diameter of no more than 150 nanometer, and wherein the concentration of said fluorosurfactant is no more than 0.35 wt % based on the weight of water in said dispersion, said fluoropolymer being a homopolymer of tetrafluoroethylene or a copolymer of tetrafluoroethylene and no more than 0.3 mole % of other fluoromonomers.

2. A dispersion comprising substantially rod shaped fluoropolymer particles in an aqueous medium containing fluorosurfactant, wherein the concentration of said fluorosurfactant is no more than 0.35 wt % based on the weight of water in said dispersion.

3. A dispersion comprising fluoropolymer particles in an aqueous medium containing fluorosurfactant wherein said fluoropolymer particles have a number average molecular weight of at least about $1 \cdot 10^6$, and at least about 20% of said particles have a length to diameter ratio of greater than 3, said fluoropolymer being a homopolymer of tetrafluoroethylene or a copolymer of tetrafluoroethylene and no more than 0.3 mole % of other fluoromonomers, the concentration of said fluorosurfactant being no more than 0.35 wt % based on the weight of water in said dispersion.

4. The dispersion of claim 3 wherein at least about 40% of said fluoropolymer particles have a length to diameter ratio of greater than 3.

5. The dispersion of claim 3 wherein at least about 75% of said fluoropolymer particles have a length to diameter ratio of greater than 3.

6. The dispersion of claim 3 wherein at least about 90% of said fluoropolymer particles have a length to diameter ratio of greater than 3.

7. The dispersion of claim 1 wherein said fluoropolymer is non-melt-fabricable.

8. The dispersion of claim 1 wherein no more than 0.20 wt % of said surfactant is present.

9. The dispersion of claim 2 wherein at least 30% of said fluoropolymer particles are substantially rod-shaped.

\* \* \* \* \*